T. FORSTER.
Manufacture of Gloves for Surgical Operations.

No. 208,586. Patented Oct. 1, 1878.

WITNESSES
Geo. N. Breck.
Wm. F. Kilgrove

INVENTOR
Thomas Forster.
By his Attorneys
Baldwin, Hopkins, & Peyton.

UNITED STATES PATENT OFFICE.

THOMAS FORSTER, OF STREATHAM, ENGLAND.

IMPROVEMENT IN MANUFACTURE OF GLOVES FOR SURGICAL OPERATIONS.

Specification forming part of Letters Patent No. 208,586, dated October 1, 1878; application filed August 26, 1878; patented in England April 17, 1878.

*To all whom it may concern:*

Be it known that I, THOMAS FORSTER, of Streatham, in the county of Surrey, England, have invented new and useful Improvements in Gloves or Coverings for the Hands for use in Surgical or other Operations where it is essential to cover the hands yet retain delicacy of touch, which improvements are fully set forth in the following specification.

This invention has for its object improvements in gloves or coverings for the hands for use in surgical or other operations where it is essential to cover the hands yet retain delicacy of touch, and in the method of manufacturing the same.

I take molds of plaster, glass, or other suitable material, and, after making a solution of india-rubber of a proper consistence, I carefully dip or immerse or paint over the molds, and then permit them to dry. I repeat the operation until the covering is sufficiently thick. I place them in a stove and carefully dry them, and then cure or vulcanize them. The perfected article is then withdrawn from the mold.

Having thus stated the nature of my invention, I will proceed to describe more in detail the manner in which I prefer to operate.

Figure 1:
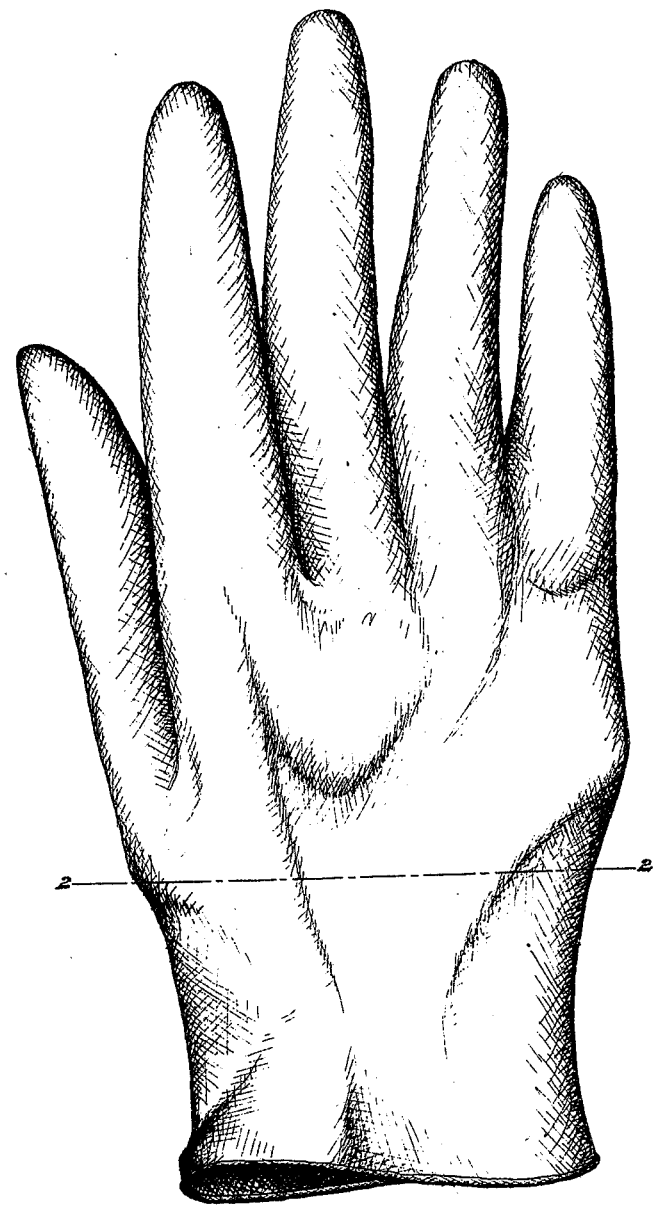
Figure 2:
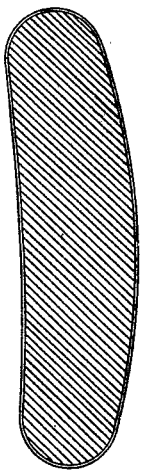

In the accompanying drawings, Figure 1 is a view of the completed glove, and Fig. 2 a section on the line 2 2 of the preceding figure, showing the mold upon which the glove is formed.

I make molds of plaster-of-paris (I find this material suits my purpose) by taking casts from a glove-last. Care must be taken to stop the pores of the plaster, and this may be very conveniently done by immersion in gelatine and water, allowing the plaster in the first instance to absorb as much as it will, and then to dry in a warm airy room. The dipping and drying should be repeated until the mold has a polished surface all over. I then take a solution of india-rubber, about one pound of rubber to seven or eight pounds of solvent—by preference good pure coal-oil—and proceed to dip the mold or plaster hand into it, and after the first dipping has dried I repeat the operation until the desired thickness is obtained. The thinner these gloves are made the better, so long as they are sufficiently strong to bear handling, as the object is to cover the hand of the user with an impervious film without interfering with the delicacy of the touch. The glove is then allowed to dry perfectly in a warm chamber free from dust, and while still upon the mold it is to be vulcanized, for which purpose I dip it into a curing solution consisting of chloride of sulphur and bisulphide of carbon. By preference one part of chloride of sulphur to sixty parts of bisulphide of carbon are suitable proportions. When dry the glove may be loosened at the wrist, and by turning it over and rolling it down the mold the glove may be stripped off readily.

If by one immersion in the curing solution the glove is insufficiently acted upon, it should be dipped a second time.

What I claim is—

The novel manufacture of impervious vulcanized india-rubber-film gloves, substantially as described.

THOMAS FORSTER.

Witnesses:
  G. F. WARREN,
*Notary Public, 17 Gracechurch Street, London,*
  JNO. DEAN,
*Of same place, Notary's Clerk.*